(12) United States Patent
Kumar et al.

(10) Patent No.: US 9,643,454 B2
(45) Date of Patent: May 9, 2017

(54) SEEDER TIRE

(71) Applicant: Superior Tire & Rubber Corp., Warren, PA (US)

(72) Inventors: Arun Kumar, Warren, PA (US); Paul E. Waite, Bear Lake, PA (US); Henri E. LeMeur, Jr., Warren, PA (US)

(73) Assignee: Superior Tire & Rubber Corporation, Warren, PA (US)

( * ) Notice: Subject to any disclaimer, the term of this patent is extended or adjusted under 35 U.S.C. 154(b) by 83 days.

(21) Appl. No.: 14/532,685

(22) Filed: Nov. 4, 2014

(65) Prior Publication Data

US 2015/0122386 A1    May 7, 2015

Related U.S. Application Data

(60) Provisional application No. 61/899,927, filed on Nov. 5, 2013.

(51) Int. Cl.
| | | |
|---|---|---|
| *B60C 7/20* | (2006.01) | |
| *B60C 7/12* | (2006.01) | |
| *B29D 30/02* | (2006.01) | |
| *B60C 7/10* | (2006.01) | |
| *B60C 7/00* | (2006.01) | |
| *B29K 75/00* | (2006.01) | |

(52) U.S. Cl.
CPC .............. *B60C 7/125* (2013.01); *B29D 30/02* (2013.01); *B60C 7/102* (2013.04); *B29K 2075/00* (2013.01); *B29K 2995/007* (2013.01); *B60C 2007/005* (2013.04)

(58) Field of Classification Search
CPC ........................... B60C 2007/005; B60C 7/22
USPC ......................................... 152/324, 325, 327
See application file for complete search history.

(56) References Cited

U.S. PATENT DOCUMENTS

| 2,978,277 | A | * | 4/1961 | Gaudry | ................... A47L 9/009 |
| | | | | | 152/324 |
| 3,450,182 | A | * | 6/1969 | Verdier | ..................... B60C 3/00 |
| | | | | | 152/209.16 |
| 4,430,952 | A | * | 2/1984 | Murray | .................. A01O 5/064 |
| | | | | | 111/137 |
| 4,449,756 | A | * | 5/1984 | Weeks | ................... B62D 55/14 |
| | | | | | 301/37.42 |
| 4,493,274 | A | * | 1/1985 | Robinson, Jr. | ........... A01O 5/06 |
| | | | | | 111/135 |
| 4,733,730 | A | * | 3/1988 | Murray | .................. A01O 5/068 |
| | | | | | 111/135 |

(Continued)

*Primary Examiner* — Jeffrey J Restifo
(74) *Attorney, Agent, or Firm* — Boardman & Clark LLP

(57) ABSTRACT

A tire for planting equipment is disclosed, the tire composed of a tire material and comprising: a rim-mounting surface, a first side wall having a thickness, a second side wall having a thickness, and a contact wall having a thickness and defining a contact area; the first, second, and contact walls defining a hollow channel, and the second side wall having a tapered portion and disc contact portion. A method for manufacturing a seeder tire of variable hardness is also disclosed, the method comprising the steps of: introducing a first polyurethane compound having a first hardness value into a first portion of a tire mold; allowing an amount of time to elapse wherein the first polyurethane compound will gel; and introducing a second polyurethane compound having a second hardness value into a second portion of the mold.

14 Claims, 5 Drawing Sheets

(56) References Cited

U.S. PATENT DOCUMENTS

| | | | | |
|---|---|---|---|---|
| 4,802,519 A * | 2/1989 | Moranz | B60B 33/0028 | 152/325 |
| 4,998,980 A * | 3/1991 | Katou | B60O 7/12 | 152/324 |
| 5,167,439 A * | 12/1992 | Green | B60B 15/20 | 152/5 |
| 5,343,916 A * | 9/1994 | Duddey | B60O 7/12 | 152/326 |
| 5,460,213 A * | 10/1995 | Pajtas | B29C 33/76 | 152/11 |
| 5,533,793 A * | 7/1996 | Walker | B60B 3/002 | 152/453 |
| 5,887,664 A * | 3/1999 | Whalen | A01B 23/06 | 111/135 |
| 6,102,091 A * | 8/2000 | Peterson | A63C 17/223 | 152/165 |
| 6,227,622 B1 * | 5/2001 | Roderick | A63C 17/223 | 152/323 |
| 6,463,972 B1 * | 10/2002 | Lacour | B29D 30/02 | 152/158 |
| 6,644,223 B2 * | 11/2003 | Prairie | A01B 71/02 | 111/137 |
| 6,820,669 B2 * | 11/2004 | Hodges | B60B 21/04 | 152/455 |
| 6,845,796 B2 * | 1/2005 | Katoh | B29D 30/02 | 152/209.1 |
| 7,128,110 B2 * | 10/2006 | Yamazaki | B60C 11/0316 | 152/209.12 |
| 7,481,278 B1 * | 1/2009 | Pomedli | A01C 5/064 | 111/167 |
| 7,481,498 B1 * | 1/2009 | Morris | B60B 3/001 | 152/324 |
| 8,037,911 B2 * | 10/2011 | Morris | B29C 45/1657 | 152/323 |
| 8,544,516 B2 * | 10/2013 | Mariman | A01O 5/06 | 111/135 |
| 2005/0218712 A1 * | 10/2005 | Beaumier | A63C 17/22 | 301/5.308 |
| 2014/0319899 A1 * | 10/2014 | Colon | A63C 17/22 | 301/5.301 |
| 2015/0122386 A1 * | 5/2015 | Kumar | B60O 7/125 | 152/327 |

* cited by examiner

SEEDER TIRE

CROSS-REFERENCE TO RELATED APPLICATIONS

This application claims the priority of U.S. provisional patent application No. 61/899,927, filed Nov. 5, 2013, the entirety of which is incorporated herein by reference.

FIELD

The present disclosure relates to the field of tires for a wheel. More specifically, the present disclosure relates to tires for agricultural equipment.

BACKGROUND

Tires for a wheel are generally known in the art. A tire is a ring-shaped wheel cover that fits around a wheel to help protect the wheel and enhance wheel and overall machine performance.

Tires for use with planting equipment are also known. These tires improve certain performance characteristics over a wheel. In "no-till" planting equipment, tires provide certain advantages. For example, in no-till planting equipment, seeder tires are used to ensure a seed is planted at the correct depth. Seeder tires generally are provided on narrow gauge wheels. Due to requirements during no-till planting, commercial seeder tires are solid tires. This is typically due to wear requirements of seeder tires in no-till planting equipment. For example, seeder tires generally have to withstand abrasive wear against knives which create channels for the receipt of seeds. Seeder tires typically have a secondary functionality of wiping or cleaning material buildup on the knives during no-till planting.

Seeder tires are also subject to toughness and coarseness of crop stubble, often due to genetic modification. Therefore, the tires must be made to withstand greater cut and tear properties, which solid tires typically can better withstand.

SUMMARY

Solid tires have certain disadvantages in planting equipment. For example, solid tires are unable to absorb irregularities in the ground over which the solid tire travels. Instead, solid tires experience a reaction force in a direction other than the direction of travel. This results in transfer of force caused by irregularities in the ground throughout the planting equipment. This may lead to damage of the planting equipment due to the planting equipment absorbing the reaction force instead of the tire.

Specifically in no-till planting equipment, this may also lead to a seed being planted at an incorrect depth. In addition, solid tires require more material due to the solid nature of the tire, causing an increase in tire mass (and associated weight).

Accordingly, there is a need for a seeder tire that can better absorb irregularities in the ground, thereby better avoiding equipment damage, and leading to more consistent seed planting depth. In addition, there is a need for a seeder tire that is lighter and requires less material.

The present disclosure is directed to one or more embodiments of a seeder tire. While the embodiments are described in the context of no-till planting equipment, this disclosure should be understood that the seeder tire may be used with other types of planting equipment.

The tire, according to various embodiments, typically includes one or more thermoset polyurethane compounds. Polyurethane generally has a preferable hardness, tear strength, elasticity, and specific gravity as further described herein. In various embodiments, the tire material offers low surface energy reducing mud and material deposit on the tire. In various embodiments, the material also may provide preferential wear characteristics for the tire.

The seeder tire, according to various embodiments, includes a hollow tire structure. In various embodiments, the seeder tire of the present disclosure has a first and second side wall. In various embodiments, the first and second side walls may have a varying thickness and define one or more shoulder elements. The first and second side walls may be connected by a contact surface which has a contact area. According to various embodiments, the contact area defines a hollow channel. The hollow channel may be bulbous in shape. The bulbous hollow channel and thermoset polyurethane compound together have various advantages, including reducing tire mass. The reduced tire mass leads to reduced cost, increased ease of handling, and reduced tractor loading.

The seeder tire may use more than one polyurethane compound to produce varying hardness on the tire. The thermoset polyurethane on the contact area of the tire may have a higher hardness value than the thermoset polyurethane used in the remainder of the tire. The material of the seeder tire may also include additives which may enhance tear strength or decrease surface energy.

The seeder tire may also include a mounting or wall structure. This feature allows for the tire to be mounted to the wheel rim, specifically using a split-rim structure.

In various embodiments, the seeder tire also includes a sidewall structure adapted or configured to engage a planting disc in order to wipe or clean the disc while also increasing sidewall abrasion resistance. This sidewall structure may include a disc contact portion coupled to the second side wall. A tapered portion may lead from the second side wall to the disc contact portion. This structure has various advantages, including increasing tire wear life, as the tapered portion allows for a channel of buffer material during disc wiping or cleaning, delaying contact with the body of the tire.

The seeder tire according to various embodiments further includes a contact area width to sidewall height aspect ratio as shown in the Figures. The height aspect ratio increases tire wear life by reducing the concentration of tire stress when the seeder tire flexes. The formation avoids stress points which can cause tire failure. Flexing of the seeder tire may occur due to contact of an irregularity in the ground over which the seeder tire rolls. The sidewalls also help maintain rigidity, further preventing the tire from collapsing when uneven terrain is encountered.

In various embodiments, the tire also allows for a thick mounting wall for split-rim mounting.

The present disclosure relates to a tire for planting equipment, the tire composed of a tire material and comprising: a rim-mounting surface, a first side wall having a thickness, a second side wall having a thickness, and a contact wall having a thickness; the first, second, and contact walls defining a hollow channel, and the second side wall having a tapered portion and disc contact portion.

The present disclosure further relates to a method for manufacturing a seeder tire of variable hardness, the method comprising the steps of: introducing a first polyurethane compound having a first hardness value into a first portion of a tire mold; allowing an amount of time to elapse wherein the first polyurethane compound will gel; and introducing a second polyurethane compound having a second hardness value into a second portion of the mold.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

The disclosure illustrated in the Figures and disclosed herein is generally directed to one or more embodiments of seeder tire for use on a seeder wheel in planting equipment, including no-till planting equipment. While the figures and disclosure may specifically reference no-till planting equipment, it should be appreciated that the seeder tire may be used in association with other equipment, including other planting and agricultural equipment.

Figure 1:
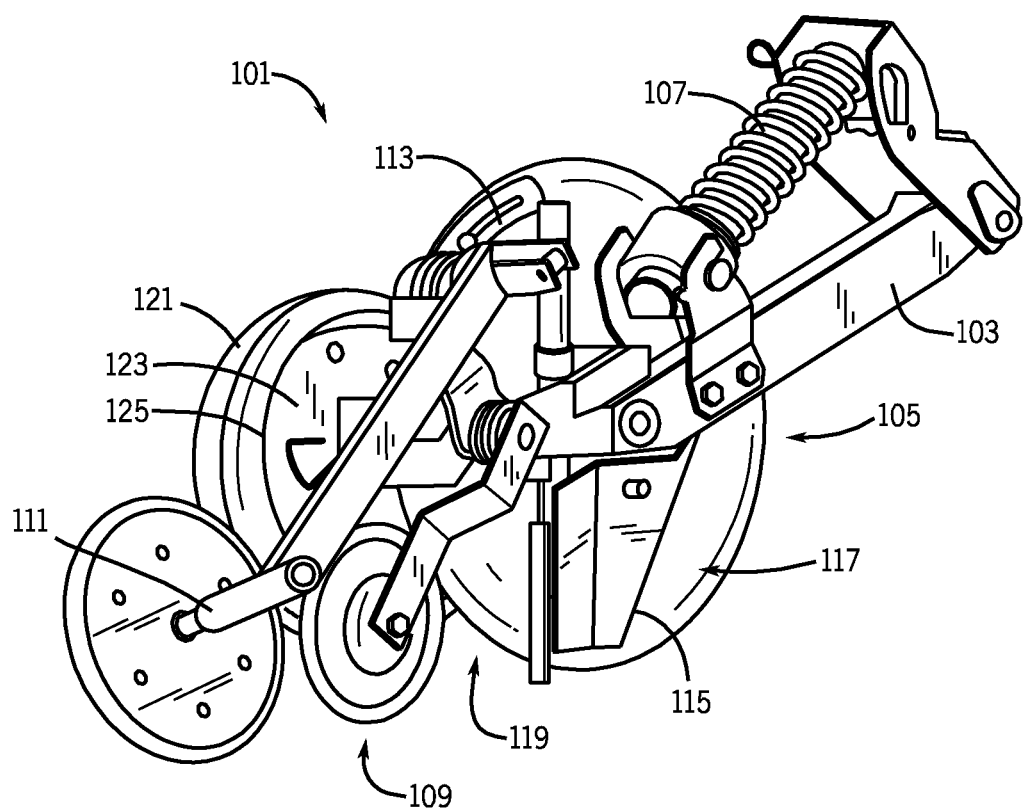
FIG. 1 is an isometric view of an example of a portion of a prior art no-till planter which includes a solid seeder tire.

Referring to FIG. 1, an example of a portion of prior art no-till planting equipment is illustrated. More specifically, an example of a portion of a prior art no-till planting apparatus 101 using a seeder wheel 123 is illustrated. Planting equipment 101 includes a planter arm 103. An opener gauge wheel or disc or knife 105 may be coupled to planter arm 103. Disc or knife 105 is provided to engage and open soil, creating a furrow for the receipt of seeds, seedlings, or other plants to be planted by no-till planting equipment 101. Planter arm 103 may also include a pressure adjustment arm 107 for adjusting the down pressure in which disc or knife 105 may engage soil to generate consistent seed placement.

A seed firming wheel 109 may optionally be coupled to planter arm 103. Seed firming wheel 109 may gently pack a seed, seedling, or other plant to be planted at the bottom of the furrow. A packer wheel 111 may be coupled to planter arm 103 in order to close the furrow after seed placement. A depth control assembly 113 may be coupled to planter arm 103 and provided to make depth adjustments to seeding depth.

A scraper 115 may be provided on a first side 117 of the disc. Scraper 115 may be coupled to planter arm 103 and be provided to protect against plugging, while additionally acting as a seed boot, creating a shelf for accurate seed placement in the furrow. Seeder wheel 123 may be provided on a second side of the disc. Seeder wheel 123 carries a seeder tire 121 which engages or rolls over the soil or ground. In addition, seeder tire 123 contacts the second side 119 of disc or knife 105, creating a cleaning action to facilitate removal of debris deposited on the disc during planting operations. It should be appreciated that seeder tire 121 illustrated in FIG. 1 is a solid tire which is known and/or currently used in association with no-till planting equipment 101.

Figure 2:
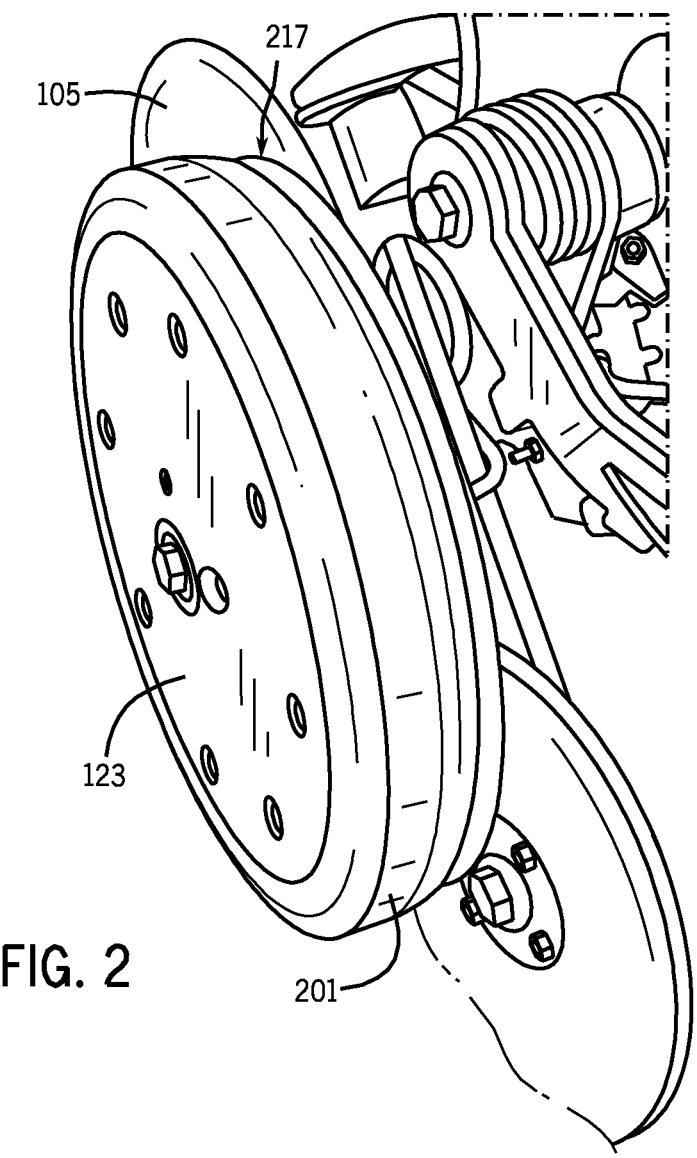
FIG. 2 is an isometric view of an example of a no-till planter carrying a seeder wheel, the seeder wheel having the improved seeder tire according to one or more various examples of embodiments.

FIG. 2 illustrates a no-till planter 101 having a seeder wheel 123 according to various embodiments. In various embodiments, seeder wheel 123 carries a seeder tire 201 disclosed in accordance with the detailed description provided herein. In addition, as shown in FIG. 2, seeder tire 201 includes a disc or knife contact area 217. In various embodiments, seeder tire 201 assists in the removal or cleaning of disc or knife 105 by facilitating removal of debris deposited on disc or knife 105 (e.g., during operation or more specifically planting operation).

Figure 3:
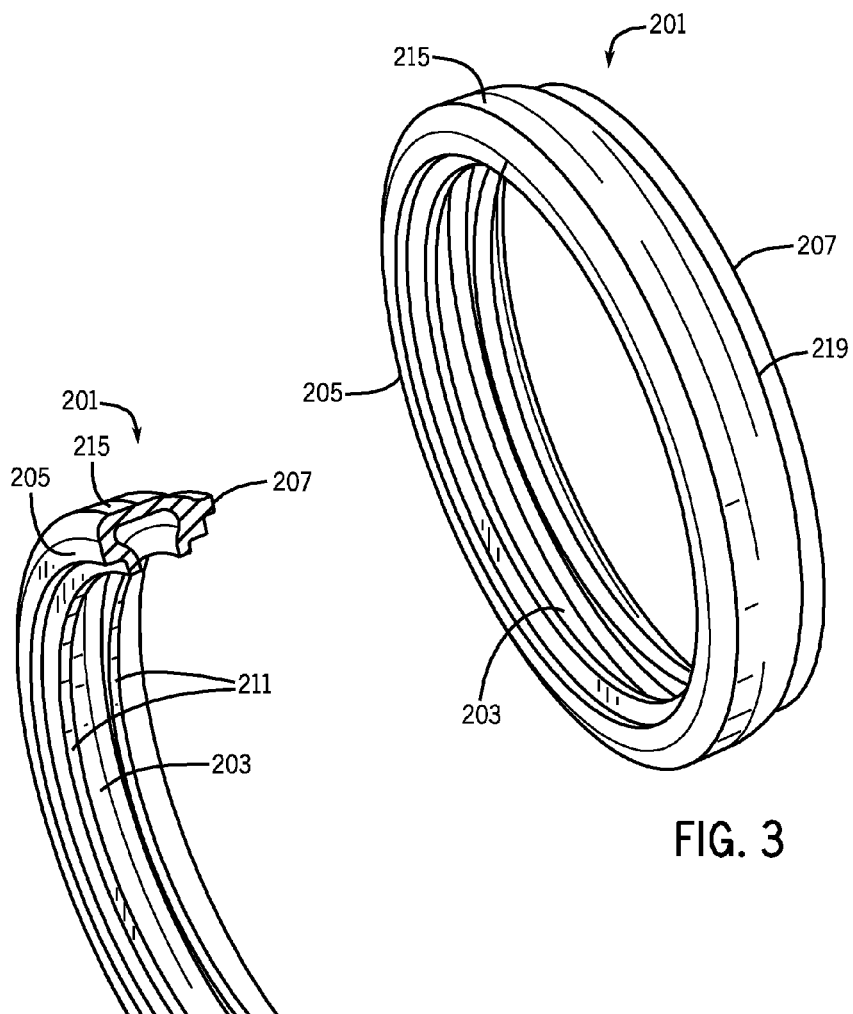
FIG. 3 is an isometric view of a seeder tire, according to one or more various examples of embodiments.
Figure 4:
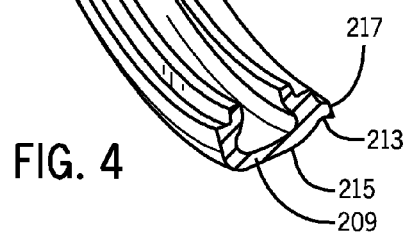
FIG. 4 is an isometric view of a cross-section of the seeder tire of FIG. 3, according to one or more various examples of embodiments.

FIGS. 3-9 further illustrate one or more examples of embodiments of seeder tire 201. Referring to FIGS. 3-4, in various embodiments, seeder tire 201 includes or defines a hollow channel 203 provided within seeder tire 201. In various examples of embodiments, hollow channel 203 is defined by a first side wall 205 separated or spaced from a second side wall 207 by a contact area 209. In various embodiments, contact area 209 or more specifically, a contact surface 215 of contact area 209, is provided to contact the ground, soil, or other surface over which seeder tire 201 rolls or is adapted or configured to roll. In various embodiments, opposing mounting rims 211 may respectively be connected to first side wall 205 and second side wall 207 to facilitate mounting upon a wheel rim.

In various embodiments, hollow channel 203 includes a variable, tapered, or increasing channel width, as defined as the distance between the first and second side walls taken approximately perpendicularly to the side walls. More specifically, in various embodiments, the width of hollow channel 203 increases across the channel when traveling from mounting rims 211 towards contact surface 215. In various embodiments, the width of hollow channel 203 at a first point or distance near contact area 209 is greater than the width of hollow channel 203 at a second point or distance further than first contact point from contact area 209. This helps provide a bulbous cross-sectional shape of hollow channel 203. In various examples of embodiments, hollow channel 203 advantageously reduces tire mass, and reduces the amount of material necessary to manufacture the tire. The lighter, reduced mass structure may also advantageously offer ease of handling and reduced tractor loading.

A tapering portion 213 may be provided to connect the disc or knife contact surface 217 with second side wall 207. In various embodiments, the diameter (e.g., outside diameter) of tire 201 at tapering portion 213 nearer contact area 209 is greater or larger than the diameter (e.g., outside diameter) of tire 201 further from contact area 209 or closer to disc or knife contact surface 217. Disc contact portion 217 may be provided on second side wall 207 at an end of tapering portion 213 furthest away from the contact surface 215. Disc contact portion 217 may include an amount of tire material which extends approximately perpendicular to and projects away from second side wall 207. Further, disc contact portion 217 may project away from hollow channel 203. Disc contact portion 217 is adapted or configured to contact with or nearly contact disc or knife 105 of no-till seeder 101. Thus, as seeder tire 201 rolls, disc or knife contact portion 217 provides a wiping or cleaning of material buildup on disc or knife 105 during planting. In addition, it is not atypical for the tire material of a disc contact portion to wear away or decrease over a period of time of use, due to the contact with the disc or knife during planting. Accordingly, in various embodiments, disc contact portion 217 is provided with sufficient material to allow for wear over time.

Figure 5:
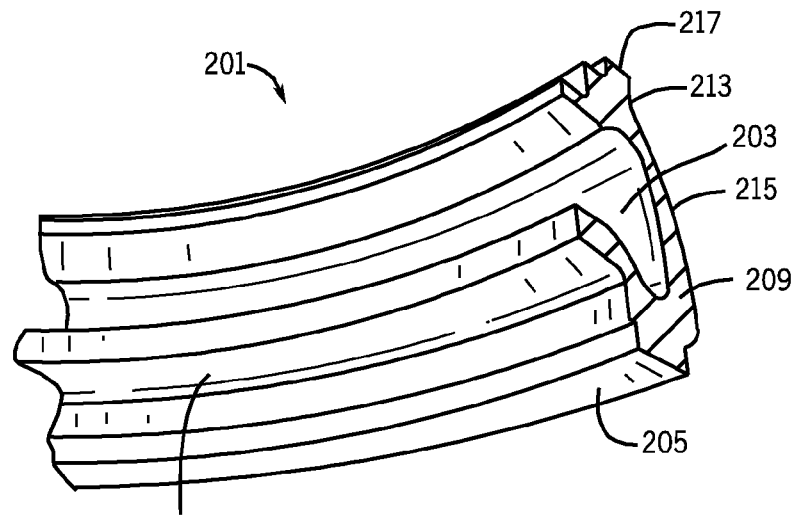
FIG. 5 is an illustration of a portion of an interior of a seeder tire, illustrating the thick mounting wall for split rim mounting, according to one or more various examples of embodiments.
Figure 6:
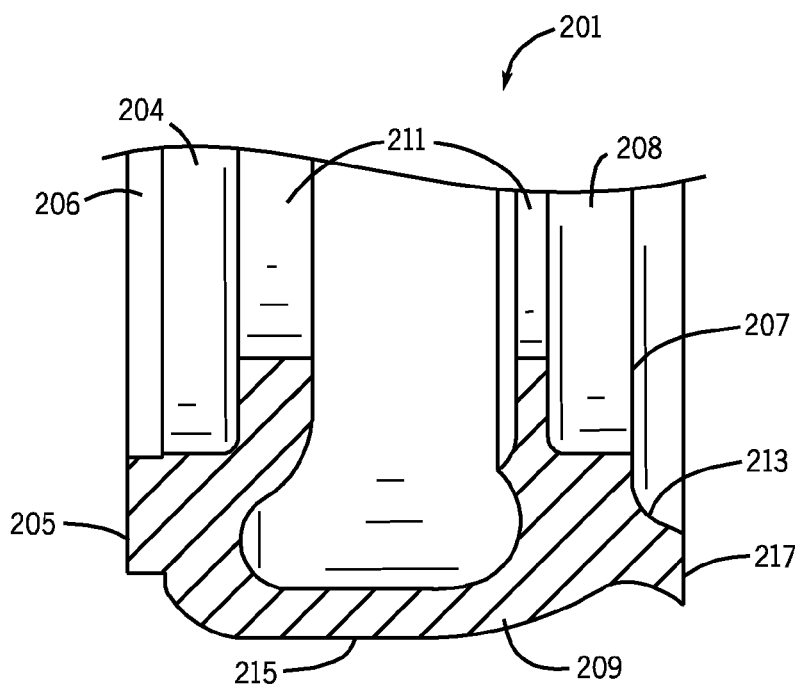
FIG. 6 is an illustration of a portion of an interior of a improved seeder tire, illustrating the hollow interior and the even wall thickness of the contact area, according to one or more various examples of embodiments.

FIGS. 5 and 6 illustrate representative portions of the interior of seeder tire 201. FIG. 5 illustrates seeder tire 201, and the mounting rims or mounting walls 211 for split-rim mounting, according to one or more examples of embodiments. FIG. 6 illustrates seeder tire 201, and the even or substantially even wall thickness of the contact area wall 215 around hollow channel 203 according to one or more examples of embodiments of the seeder tire 201. It should be appreciated from one or more examples of embodiments of seeder tire 201, and shown in FIGS. 5 and 6, that the thickness of the mounting walls or mounting rims 211 may be different. For example, as shown in FIG. 6, mounting wall or rim 211 on the first side wall 205 side of the tire 201, may have a thickness which is greater than mounting wall or rim 211 on the second side wall 207 side of the tire.

It should also be appreciated first side wall 205 and second side wall 207 may have a varying thickness. In various embodiments, mounting wall or rim 211 and first 205 and second 207 side wall may define one or more shoulders between the mounting wall or rims 211 and contact area 215. The first and second side walls, in various embodiments, may have several different thicknesses (compare FIGS. 5 and 6 with FIGS. 4 and 9). Specifically, as shown in FIGS. 5 and 6, first side wall 205 may have a first shoulder 204 and an enhanced rectangular wall portion 206 defining a second shoulder. Similarly, second side wall 207 may have a first shoulder 208 leading to tapered portion 213 and contact surface 217.

Bulbous hollow channel 203 and even contact area 209 thickness of tire 201 at contact surface 215 may help reduce stress points which could collapse, damage or otherwise modify tire 201 during use, while helping maintain sufficient wear strength of contact surface 215 with the ground. In various embodiments, the width of contact area 209 and height of the side walls (first side wall 205 and second side wall 207) may have an aspect ratio of around 1.5:1 to 2.5:1, with a preferable embodiment around 1.8:1.

Figure 7:
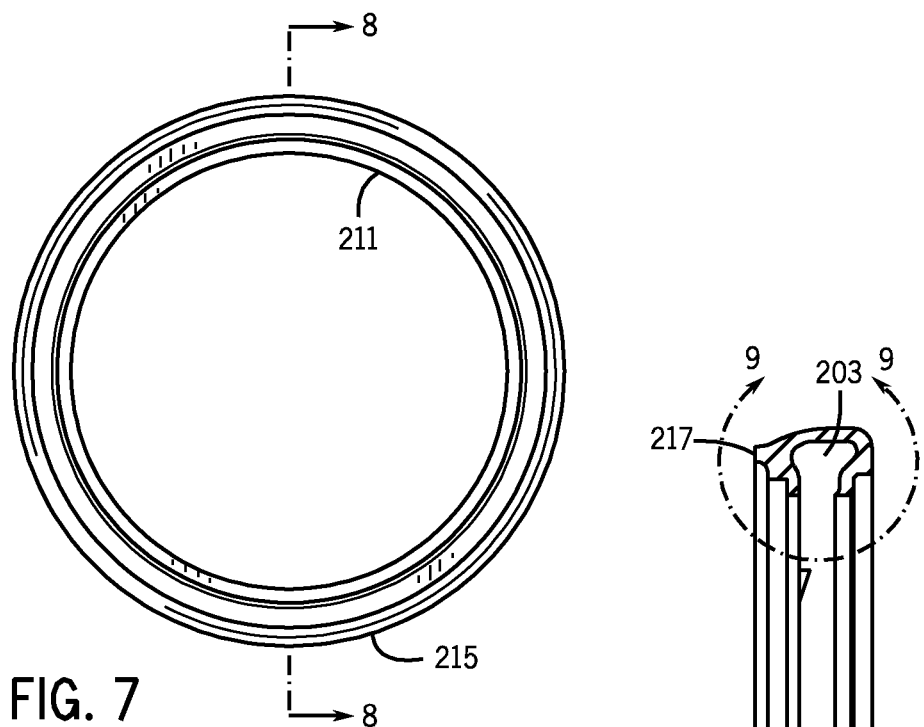
FIG. 7 is a side view of an improved seeder tire, according to one or more various examples of embodiments.
Figure 8:
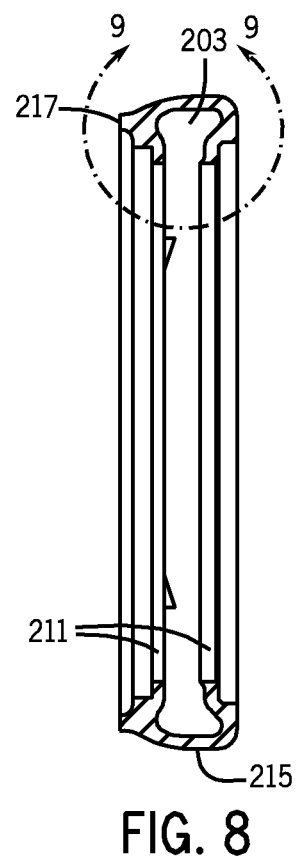
FIG. 8 is a cross-sectional view of the seeder tire of FIG. 7, according to one or more various examples of embodiments.
Figure 9:
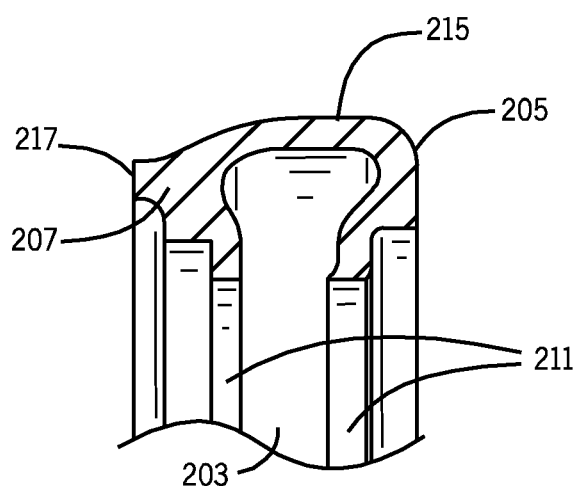
FIG. 9 is a detailed cross-sectional view of a portion of the seeder tire of FIG. 8, according to one or more various examples of embodiments.

FIGS. 7-9 illustrate seeder tire 201, and further illustrate novel hollow channel 203 and tapered portion 213, according to one or more examples of embodiments.

It should be appreciated that by reducing the mass of improved seeder tire 201 through introduction of hollow channel 203, less material is necessary to manufacture improved seeder tire 201. This also advantageously allows for use of a polyurethane compound as the manufacturing material which seeder tire 201 is made. The polyurethane compound is an engineered elastomer which typically has a higher cost than commercial elastomeric material used in known tires but may be made more affordable because of the overall reduction in needed material.

In various embodiments, the polyurethane compound is a thermoset polyurethane. In various examples of embodiments, the preferred polyurethane compound for use in seeder tire 201 preferably has a hardness of approximately 80 to 100 Shore A, and more preferably approximately 93 Shore A. In addition, in various embodiments, the polyurethane compound preferably has a tear strength (in units of kN/m) using ASTM D-624 (Die C) of approximately 100 to 150 kN/m, and more preferably approximately 120 kN/m, and using ASTM D-1938 (Trouser Tear) of approximately 50 to 80 kN/m, and more preferably approximately 65 kN/m. In various embodiments, the polyurethane compound also preferably includes a 100% secant modulus of 10 to 13 MPa, and more preferably around 11.5 MPa. Further, in various embodiments, the cured molded part has a specific gravity of 1.2 to 1.4 g/cc, and more preferably around 1.3 gm/cc.

In one or more examples of embodiments of seeder tire 201 disclosed herein, seeder tire 201 may be manufactured with a variable hardness. More specifically, the seeder tire may be molded with a variable hardness. Stated otherwise, the tire may have a portion which has a first hardness value or range of hardness values, and a second portion which has a second hardness value or range of hardness values, wherein the first hardness value or range of values is separate and/or different from the second hardness value or range of values.

To manufacture a variable hardness seeder tire 201, a custom mold may be designed allowing for a multi-stage manufacturing process. A multi-stage manufacturing process of seeder tire 201 may include a plurality of steps, including the steps of: (1) introducing a first polyurethane (having a first hardness value) into a first portion of the mold; (2) allowing an amount of time to elapse wherein the first polyurethane will gel; and (3) introducing a second polyurethane (having a second hardness value) into a second portion of the mold. As a non-limiting example of a multi-stage manufacturing process for a seeder tire, the first polyurethane, or Polyurethane A, may be poured into the rim mounting area of the seeder tire mold (i.e. the portion which forms mounting rims). After a period of time elapses to allow Polyurethane A to gel, the second polyurethane, or Polyurethane B, may be poured into the tread area of the seeder tire mold (i.e. the portion which forms the contact surface). In the present example, Polyurethane A may have a higher hardness value than Polyurethane B. Both Polyurethane A and Polyurethane B may be cured and post-cured together to give a final product with a variable hardness. In a variable hardness seeder tire, the rim mounting surface (i.e. Polyurethane A) may have a higher hardness than the tread surface (i.e. Polyurethane B). Polyurethane A may have a higher hardness of up to 10 points on a Shore A hardness scale, and more preferably of up to 5 points on the Shore A hardness scale, than Polyurethane B. Polyurethane A and Polyurethane B may be different grades of Toluene Diisocyanate (TDI), Methylene Diisocyanate (MDI), Naphthalene Diisocyanate (NDI), or Quasi MDI systems or a mix of two or more of such grades. Manufacturing a seeder tire with variable hardness may have certain advantages. For example, the seeder tire life may be further increased over a seeder tire have a single hardness.

In one or more examples of embodiments of seeder tire 201 disclosed herein, one or more additives may be introduced to the polyurethane(s) to adjust the surface energy. More specifically, one or more additives may be introduced to the polyurethane(s) to lower surface energy. Examples of such additives may include, but are not limited to, silicone polymers and/or fluoropolymers. An example of a commercially available silicone polymer includes DABCO DC sold by Air Products and Chemicals, Inc. of Allentown, Pa. An example of a commercially available fluoropolymer includes DUPONT FLUOROGUARD sold by E. I. du Pont de Nemours and Company of Wilmington, Del.

The polyurethane compound provides offers advantages over traditional materials used in solid tires. For example, the polyurethane compound offers low surface energy which reduces material sticking to the tire thereby giving a cleaner and more consistent surface for placing seeds in furrows. In addition, the polyurethane compound offers improved abrasion, cut, and tear resistance, improving the tire's longevity in applications particularly with genetically modified crops. Further, the polyurethane compound offers improved wear characteristics for the seeder tire to work in contact with the steel disc or knife blade that produces the furrow for seed planting.

In one or more examples of embodiments of seeder tire 201 disclosed herein, one or more additives may also be introduced to the polyurethane(s) to improve tear strength. Examples of such additives may include, but are not limited to, fiberglass, carbon fiber, or Kevlar. In various embodiments, the additive may comprise more than five percent but less than twenty percent of the tire compound.

The technical effects and technical problems in the specification are exemplary and are not limiting. It should be noted that the embodiments described in the specification may have other technical effects and can solve other technical problems.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A tire for agricultural equipment comprising: a first mounting rim spaced apart from a second mounting rim, a first side wall having a thickness and coupled to the first mounting rim, a second side wall having a thickness and coupled to the second mounting rim, a contact wall extending between the first side wall and second side wall and having a thickness and defining a contact area; wherein the mounting rims are configured to be mounted to a wheel rim such that the mounting rims, first side wall, second side wall, contact wall, and said wheel rim define a hollow channel when the mounting rims are mounted on said wheel rim, and the second side wall including a tapered portion leading to a projecting disc contact portion.

2. The tire of claim 1, wherein the first side wall and second side wall thicknesses are varied.

3. The tire of claim 1 wherein the hollow channel is bulbous in cross-section.

4. The tire of claim 1, wherein the first and second walls define one or more shoulder areas.

5. The tire of claim 1, wherein the tire is comprised of one or more polyurethane compounds.

6. The tire of claim 5, wherein the polyurethane compound is selected from one or more of the group of TDI, MDI, NDI, or Quasi MDI systems.

7. The tire of claim 1, wherein the tire is comprised of a thermoset polyurethane compound.

8. The tire of claim 1, wherein the tire comprises one or more compounds of differing hardness including a first compound having a first hardness and a second compound having a second hardness.

9. The tire of claim 8, wherein the first compound has a higher hardness than the second compound.

10. The tire of claim 9, wherein the contact wall comprises the first compound.

11. The tire of claim 9, wherein the first or second mounting rim comprises the first compound.

12. The tire of claim 1, wherein the tire comprises one or more additive compounds to enhance tear resistance, the compound selected from the group including fiberglass, carbon fiber, or Kevlar.

13. The tire of claim 1, wherein the tire comprises one or more additive compounds to decrease surface energy, the compound selected from the group including silicone polymers or fluoropolymers.

14. A method for manufacturing the tire of claim 1, including creating a custom mold, pouring one or more polyurethane compounds into the mold, and letting the compound cool.

* * * * *